(No Model.)
A. P. HINE.
SCRAP CUTTER FOR METAL SLITTING MACHINES.
No. 454,353. Patented June 16, 1891.
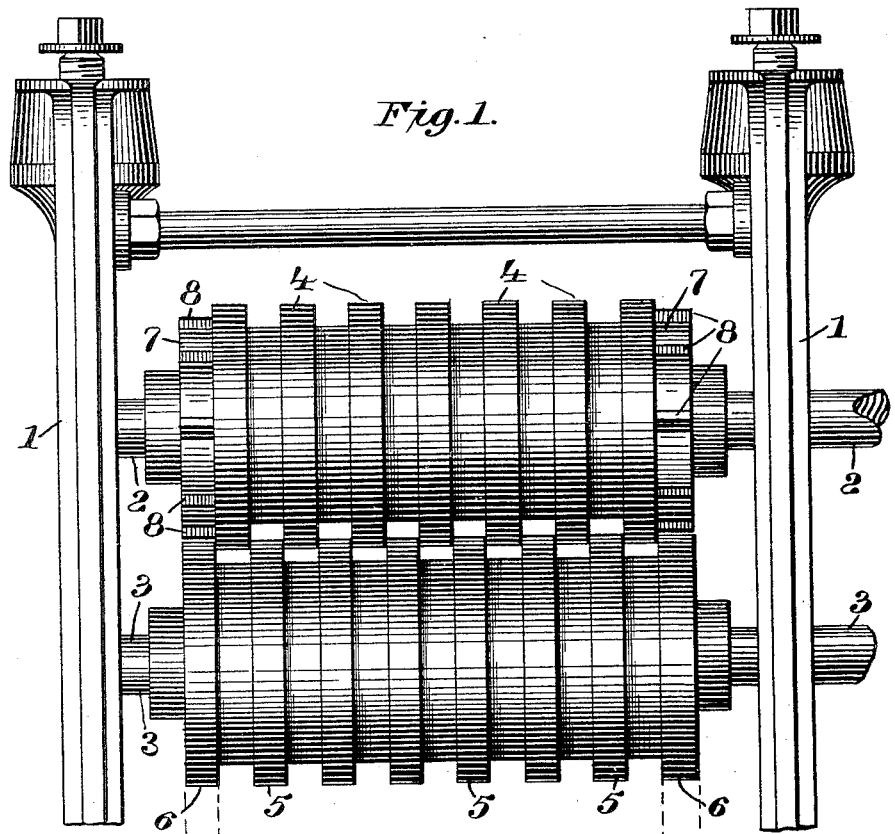
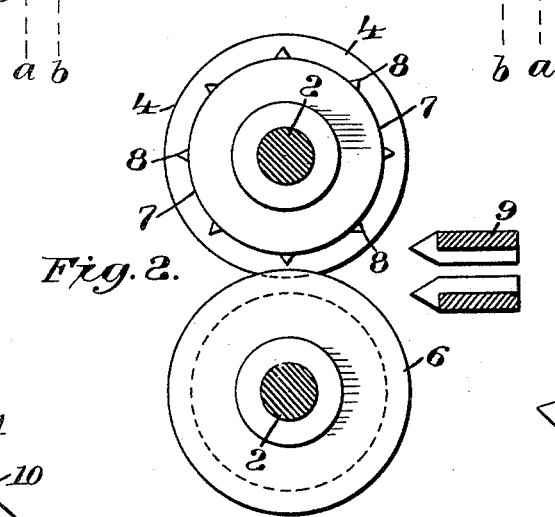
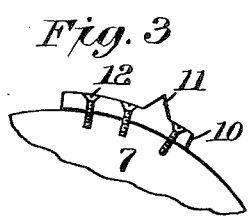
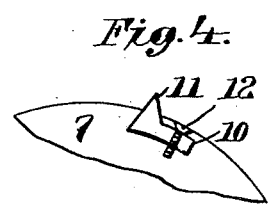
Witnesses
Wm. J. Tanner
A. J. Tanner
Inventor
Adelbert P. Hine
by his attorney
J. H. Hubbard

UNITED STATES PATENT OFFICE.

ADELBERT P. HINE, OF TORRINGTON, CONNECTICUT, ASSIGNOR TO THE COE BRASS MANUFACTURING COMPANY, OF SAME PLACE.

SCRAP-CUTTER FOR METAL-SLITTING MACHINES.

SPECIFICATION forming part of Letters Patent No. 454,353, dated June 16, 1891.

Application filed April 8, 1891. Serial No. 388,153. (No model.)

*To all whom it may concern:*

Be it known that I, ADELBERT P. HINE, a citizen of the United States, residing at Torrington, in the county of Litchfield and State of Connecticut, have invented certain new and useful Improvements in Scrap-Cutters for Metal-Slitting Machines; and I do hereby declare the following to be a full, clear, and exact description of the invention, such as will enable others skilled in the art to which it appertains to make and use the same.

This invention relates to certain new and useful improvements in scrap-cutters for sheet-metal rolls, edging-machines, or slitting-machines, and is in some respects an improvement upon and a variation of the construction shown and described in Letters Patent of the United States No. 438,845, granted to me the 21st day of October, 1890. In the machine of that patent the cutting or chopping devices, while operating in time with the devices for edging or slitting the strip, are separate from said edging devices. By means of my present improvement I am able to dispense with the separate shafts for carrying the scrap-cutters which operate to sever the strip longitudinally.

In view of the foregoing statements my invention consists in the construction and combination of elements hereinafter fully set forth, and then recited in the claims.

In order that those skilled in the art to which my invention appertains may fully understand its construction and operation, I will describe the same in detail, reference being had to the accompanying drawings, which forms a part of this specification, and in which—

Figure 1 is a front elevation of a pair of rotary slitting-shears provided with my improvement; Fig. 2, an end elevation, the shafts being sectioned; Fig. 3, a detail showing one method of attaching the cutting-chisels; Fig. 4, a similar view showing an alternative method.

Like numerals denote the same parts in all the figures.

A pair of standards or roll-housings 1 serve for the attachment of the moving parts.

2 and 3 are shafts journaled in the standards and driven from any convenient source of power. These shafts carry rotary slitters 4 and 5, which may be formed integral, or, upon the other hand, may consist of a number of rings strung and secured upon the shaft. They may be of any desired number or shape, according to the work to be done. The cutting-edges of these slitters overlap for the purpose of producing a shear cut through the metal.

6 are disks arranged at the ends of one set of the slitters, their peripheries being preferably smooth.

7 are disks opposed to the disks 6 and carrying radial chisels or cutters 8, which, however, should not quite touch the peripheries of the disks 6. I have shown both the plain-edged disks on one shaft and both cutting-disks on the other shaft; but this arrangement is not essential.

In Fig. 2 there is shown in section a guide 9, through which the metal to be slit is introduced, and forms no part of my present invention.

In Figs. 1 and 2 the chisels or cutters are shown as formed upon the surface of the disk 7. While this is feasible, I prefer to make the cutters detachable for purposes of economy and repair.

In Fig. 3 I have shown the cutter as consisting of a block 10, having a chisel-point 11, and mounted upon the disk 7 by screws or other suitable fastenings 12.

In Fig. 4 I show the periphery of the disk 7 as recessed for the accommodation of the cutter, which may be inserted lengthwise into the recess or seat and there secured by a screw or other fastening.

In the operation of my invention the sheet or strip to be slitted is fed inward through the guide 9 between the cutting-edges of the shears. That portion of the strip between the lines *b b* will be divided into longitudinal strips, whose number and width will be regulated by the construction of the shears. If the whole sheet or strip be as wide as between the lines *a a*, then the narrow edges between the lines *a b a b* will be divided transversely into short lengths by the operation of the cutters on the disk 7 against the periphery of the disk 6. This entirely dispenses with the necessity for a special attendant to care for the scrap, since the latter is divided into pieces of convenient size for remelting, as is described in the Letters Patent heretofore referred to. As the scrap is chopped or divided the pieces fall below the cutters and may be caught in any convenient receptacle arranged for that purpose.

I do not wish to be limited to the precise details of construction as shown, since these may be varied in many respects without departing from the essentials of my invention, which I deem commensurate with the terms of the claims hereunto annexed. For instance, I have shown the scrap-cutters as consisting of a series of chisels carried upon a disk and operating against another disk having a plain periphery. Both disks, however, may be provided with teeth, or may be arranged to co-operate to sever the scrap in such other manner as may be found convenient.

I claim—

1. In a machine of the character described, the combination, with the longitudinal cutters, of additional cutters carried upon the same shafts with the said longitudinal cutters and having their cutting-faces at right angles, or substantially so, to those of the longitudinal cutters.

2. The combination, with the longitudinal cutters, of two sets of transverse cutters, one at each side of the longitudinal cutters, whereby the center of the strip is divided longitudinally and the edges of said strip are divided transversely, substantially as described.

3. The combination, with a pair of parallel shafts, of a pair of co-operating rotary slitting-shears mounted thereon, a pair of disks provided with radial cutters or chisels carried by one of the shafts, and a pair of disks carried by the other shaft and adapted to furnish a support against which the chisels may cut, substantially as described.

In testimony whereof I affix my signature in presence of two witnesses.

ADELBERT P. HINE.

Witnesses:
C. F. BROOKER,
SHERMAN HARTWELL HUBBARD.